US009006620B2

(12) United States Patent
Vilato et al.

(10) Patent No.: US 9,006,620 B2
(45) Date of Patent: Apr. 14, 2015

(54) TRANSPARENT OR TRANSLUCENT GLASS CERAMIC PLATE AND A METHOD FOR THE PRODUCTION THEREOF

(75) Inventors: Pablo Vilato, Paris (FR); Franck Demol, Chateau-Thierry (FR)

(73) Assignee: Eurokera S.N.C., Chateau-Thierry (FR)

( * ) Notice: Subject to any disclaimer, the term of this patent is extended or adjusted under 35 U.S.C. 154(b) by 1523 days.

(21) Appl. No.: 12/092,710

(22) PCT Filed: Nov. 29, 2006

(86) PCT No.: PCT/FR2006/051251
§ 371 (c)(1),
(2), (4) Date: May 6, 2008

(87) PCT Pub. No.: WO2007/066030
PCT Pub. Date: Jun. 14, 2007

(65) Prior Publication Data
US 2008/0264931 A1    Oct. 30, 2008

(30) Foreign Application Priority Data

Dec. 5, 2005    (FR) ...................................... 05 53709

(51) Int. Cl.
*H05B 6/12*    (2006.01)
*D06N 7/00*    (2006.01)
(Continued)

(52) U.S. Cl.
CPC .............. *C03C 17/00* (2013.01); *C03C 2217/72* (2013.01); *C03C 2218/34* (2013.01); *H05B 3/74* (2013.01)

(58) Field of Classification Search
CPC .......... C04B 41/52; A47J 36/02; B32B 27/08
USPC ............. 219/452.11, 622; 428/408, 698, 701, 428/702, 704, 446, 336, 216, 142
See application file for complete search history.

(56) References Cited

U.S. PATENT DOCUMENTS 5,070,222 A * 12/1991 Yahav et al. ................... 219/621
5,436,058 A *  7/1995 Kato et al. ..................... 428/194
(Continued)

FOREIGN PATENT DOCUMENTS

FR    2 838 429    10/2003
FR    2 868 066     9/2005
(Continued)

OTHER PUBLICATIONS

U.S. Appl. No. 11/914,562, filed Nov. 16, 2007, Demol et al.
(Continued)

*Primary Examiner* — Dana Ross
*Assistant Examiner* — Ket D Dang
(74) *Attorney, Agent, or Firm* — Oblon, McClelland, Maier & Neustadt, L.L.P.

(57) ABSTRACT

A transparent or translucent glass-ceramic plate, capable of covering or receiving at least one underlying heating element. The plate has a coating which at least partly masks the underlying heating element(s), while still allowing the heating element(s) and optional displays to be detected. At least 90% of the coating is on the face of the plate to be turned toward the heating element(s) and optional displays in the use position. The coating has a region or a group of regions known as a background region(s), wherein the background region(s) occupy most of the surface of the coating. The coating also has a region or a group of regions known as indicating region(s), wherein the indicating region(s) making it possible to display, relative to the background region(s), a pattern, a sign and/or the location of functional elements while also making it possible to detect if the elements are in operation.

6 Claims, 3 Drawing Sheets

(51) Int. Cl.
*C03C 17/00* (2006.01)
*H05B 3/74* (2006.01)

(56) References Cited

U.S. PATENT DOCUMENTS

| | | | |
|---|---|---|---|
| 5,716,712 A * | 2/1998 | Schonig et al. | 428/428 |
| 7,009,150 B2 * | 3/2006 | Wennemann et al. | 219/452.11 |
| 7,553,519 B2 * | 6/2009 | Florent et al. | 427/387 |
| 2003/0006231 A1 * | 1/2003 | Nagata et al. | 219/622 |
| 2003/0019864 A1 * | 1/2003 | Krause et al. | 219/460.1 |
| 2004/0170823 A1 * | 9/2004 | Schultheis et al. | 428/325 |
| 2005/0214521 A1 * | 9/2005 | Florent et al. | 428/323 |
| 2005/0224491 A1 * | 10/2005 | Vilato et al. | 219/443.1 |
| 2005/0258168 A1 * | 11/2005 | Fuchs | 219/627 |

FOREIGN PATENT DOCUMENTS

| WO | WO 03084891 A2 * | 10/2003 |
|---|---|---|
| WO | 2005 092810 | 10/2005 |

OTHER PUBLICATIONS

U.S. Appl. No. 12/445,585, filed Apr. 15, 2009, Vilato, et al.

\* cited by examiner

TRANSPARENT OR TRANSLUCENT GLASS CERAMIC PLATE AND A METHOD FOR THE PRODUCTION THEREOF

BACKGROUND OF THE INVENTION

1. Field of the Invention

The present invention relates to a transparent or translucent glass-ceramic plate (these terms include plates known as semitransparent plates having, for example, coloration in the bulk) intended, especially, to cover or receive heating elements, in particular intended to serve as a hob, the heating elements associated with this hob being, for example, heat sources for induction heating, radiant heat sources, halogen heat sources, etc.

2. Description of the Background

Sales of glass-ceramic hobs have been continuing to grow over the last few years. This success is explained in particular by the attractive appearance of such hobs and by the ease of cleaning them.

It will be recalled that a glass-ceramic is originally a glass, called a precursor glass, the specific chemical composition of which allows controlled crystallization to be induced by suitable heat treatments, called ceramification. This partly crystallized specific structure gives the glass-ceramic unique properties.

At the present time, there are various types of glass-ceramic plate, each variant being the result of extensive research and many tests, given that it is very difficult to make modifications to these plates and/or to the process for obtaining them without risking an unfavorable effect on the desired properties. To be able to be used as a hob, a glass-ceramic plate must especially have a transmission in the wavelength in the visible range that is both low enough to mask at least some of the underlying heating elements when not in use and high enough so that, for the sake of safety, the user can visually detect the heating elements that are in operation without being dazzled, and the operating signs or displays giving the power of the heat sources. Generally, it must also have a high transmission in the wavelength in the infrared range, in particular for use with radiant or halogen heat sources.

The first plates developed were thus plates of dark color. More recently, other plates have been developed of lighter color (in particular white), and having, for example, a haze of at least 50% (as described in Patent FR 2 766 816), the consideration of the aforementioned criteria (such as the detection of the heating elements in operation without dazzling or unappealing appearance of said elements) sometimes being carried out to the detriment of other aspects (such as the clear viewing of optional displays placed under the plate).

SUMMARY OF THE INVENTION

The present invention has sought to develop a novel type of glass-ceramic plate allowing the range of existing products to be widened, in particular an improved glass-ceramic plate having, for the users, a surface that is easier to look after that is able to have an attractive appearance without unattractive fingerprints appearing, and, for the manufacturers, easier manufacture and handling for transporting and assembling the plates in the cooking appliances, without the modifications carried out having detrimental effects on the properties that are usually sought after.

The novel plate according to the invention is a transparent or translucent glass-ceramic plate (or panel), intended for example to cover or receive at least one heating element, in particular intended to serve as a hob (or cook-top), said plate having a coating, in particular intended to at least partly mask the underlying elements when not in use, while still allowing the heating elements and optional displays to be detected when they are in use, characterized in that most (at least 50%, preferably at least 75% and particularly preferably at least 90%), and preferably all, of the coating is (exclusively) on the face of the plate intended to be turned toward the heating element(s) in the use position (the face generally called the lower or inner face).

DETAILED DESCRIPTION OF THE INVENTION

The term "glass-ceramic plate" is understood hereafter to mean not only plates made of actual glass-ceramic, but also plates made from any other similar material that is resistant to high temperature and has a zero or almost-zero expansion coefficient (for example, less than $20 \times 10^{-7}$ $K^{-1}$). However, the plate is preferably an actual glass-ceramic plate.

The manufacture of the plates is simplified due to the fact that their coating is only deposited on one face—it will be seen through the plate when it is used—from which it results that this deposition and the subsequent handling of the plates require fewer precautions than if both faces had to have a coating. Furthermore, a coating on the upper surface complicates the maintenance of this surface, which is subjected to abrasion, soiling which may cause marks, and embrittlement.

The coating according to the invention is, preferably, applied over the entirety of the aforementioned face of the plate.

In a particularly preferred way, said coating has a region or a group of regions known as the background, occupying most of the surface of the coating (generally from 50 to 99%) and preferentially intended to mask the main part of the heating structure that the plate must cover, and a region or a group of regions called indicating regions (generally representing from 1 to 50% of the surface of the coating), making it possible to display, relative to the background, a pattern and/or a sign (trademark, logo, symbol, etc.) and/or the location of functional elements (such as the heating elements, the control units, the displays, etc.) while also making it possible to detect if these elements are in operation or not, the background region(s) and the indicating region(s) being distinguished by their colors or their shades of color and/or their patterns, the separation between the various zones being carried out along clear lines or along areas having color or pattern graduations.

Subsequently, the term "region" will be understood to mean (depending on the number of regions of each category present on the plate) both a single well-defined region (when this region is unique in its category) or a group or set of regions that are identically coated or that have the same effect (in relation to the desired contrast between the regions or groups of regions) when there are several defined regions of the same category.

The glass-ceramic base or bare substrate forming the plate (before the addition of the coating) is preferentially transparent or translucent as previously indicated, and generally has a light transmission $T_L$ (in the range of visible wavelengths—integrated between 0.38 μm and 0.78 μm—according to the illuminant $D_{65}$) that is greater than 50%, in particular between 50 and 90%. The coating (and the layers forming it as explained subsequently) is preferentially chosen so that the plate equipped with the coating according to the invention has, with regard to its background region, a very low light transmission (especially less than 5 or 10%, or even almost zero or zero), the region known as the indicating region itself possibly having a light transmission that is less, for example, than 20% (especially between 0.2 and 20%), in particular less than 10% (especially between 0.5 and 10%).

The background region(s) and the indicating region(s) may especially each be formed by at least one layer of paint, or at least one thin layer, or a layer containing effect pigments, or an enamel layer, etc., generally and advantageously opaque or reflective (and/or optionally semitransparent or semireflective) depending on the regions. All of the various regions of the coating are, preferably, formed from layers of paint and thin layers, or else only from layers of paint. The various coating regions may then be distinguished by the fact that different paints and/or paints having the same base but with different pigments or mixtures of pigments and/or with different pigment concentrations, and/or else paint applied with different thicknesses and/or applied with a different number of layers, have been used.

The coating may comprise regions having a mesh or speckled or spotted screen or patterns. It is thus possible to create esthetic light distribution and scattering effects during the use of the plate.

The layer or layers of paint which may be used are advantageously chosen so as to be resistant to high temperatures and to have stability over time with respect to their color and their cohesion with the plate, and so as not to affect the mechanical properties of the plate.

The paint or paints used advantageously have a decomposition temperature above 350° C., in particular between 350° C. and 700° C. They are generally based on resin(s), where appropriate filled resins (for example filled with pigment(s) or dye(s)), and are optionally diluted to adjust their viscosity with a view to their application onto the glass-ceramic, the diluent or the solvent (for example white spirit, toluene, aromatic hydrocarbon-type solvents, such as the solvent sold under the trademark SOLVESSO 100® by Exxon, etc.) being, if necessary, removed during the subsequent curing of the paint or paints.

For example, the paint may be a paint based on at least one silicone resin, in particular a silicone resin modified by the incorporation of at least one radical such as an alkyd or phenyl or methyl radical, etc. It is also possible to add pigments as dyes, such as pigments for enamels (chosen, for example, from components containing metal oxides, such as chromium oxides, copper oxides, iron oxides, cobalt oxides, nickel oxides, or from copper chromates, cobalt chromates, etc.), $TiO_2$, etc. It is also possible to use, as pigments, particles of one or more metals such as aluminum, copper, iron, etc., or alloys based on at least one of these metals.

In a particularly preferred manner, the paint used comprises at least (or is based on) a high-temperature resistant (co)polymer (in particular, one having a decomposition temperature above 400° C.), this paint possibly or possibly not incorporating at least one mineral filler to ensure its cohesion or its mechanical reinforcement and/or its coloration. This (co)polymer or resin may especially be one or more of the following resins: polyimide resin, polyamide resin, polyfluorinated resin and/or polysiloxane resin.

The polysiloxane resins are particularly preferred: they are colorless, and are therefore capable of being colored (for example with fillers or pigments giving them the desired color); they may be used in the crosslinkable state (generally via the presence of SiOH and/or SiOMe groups in their formula, these groups most often occurring up to 1 to 6% by weight of their total weight), or converted (crosslinked or pyrolyzed). They advantageously have in their formula phenyl, ethyl, propyl and/or vinyl units, very advantageously phenyl and/or methyl units. They are preferably chosen from polydimethylsiloxanes, polydiphenylsiloxanes, phenylmethylsiloxane polymers and dimethylsiloxane/diphenylsiloxane copolymers.

The crosslinkable polysiloxane resins preferentially used generally have a weight-average molecular weight ($M_w$) between 2000 and 300 000 daltons.

In a nonlimiting way, it may be mentioned that the following resins, used alone or as a mixture, are perfectly suitable: Dow Corning® 804, 805, 806, 808, 840, 249, 409 HS and 418 HS, RHODORSIL® 6405 and 6406 from Rhodia, TRIPLUS® from General Electric Silicone and SILRES® 604 from Wacker Chemie GmbH.

The resins thus chosen are especially able to resist heating by induction and may also be suitable (in particular the above polysiloxane resins) for other types of heating (gas burner, or even radiant or halogen heating).

The paint may be free from mineral fillers, especially if its thickness remains small. However, such mineral fillers are generally used, for example, to mechanically strengthen the deposited paint layer, to contribute to the cohesion of said layer and its bonding to the plate, to combat the appearance and propagation of cracks within it, etc. To such ends, at least one fraction of said mineral fillers preferentially has a lamellar structure. The fillers may also be involved in the coloration. Where appropriate, several types of additional fillers may be involved (for example uncolored fillers for the mechanical reinforcement and other fillers such as pigments for the coloration). The effective amount of mineral fillers generally corresponds to a volume content of 10 to 60%, more particularly of 15 to 30% (volume contents based on the total volume of fillers and paint).

The thickness of each deposited paint layer may be between 1 and 100 microns, especially between 5 and 50 microns. The application of the paint or resin may be carried out by any suitable technique, such as deposition using a brush, a blade, by spraying, electrostatic deposition, dipping, curtain coating, deposition by screen printing, etc., and is preferably carried out by screen printing (or optionally deposition using a blade).

The deposition may be followed by a heat treatment intended to ensure, according to each particular case, drying, crosslinking, pyrolysis, etc. of the layer or layers deposited.

Preferably, at least one layer of paint is chosen in which the resin has, at least partly, been partially or completely crosslinked and/or pyrolyzed, and/or has not been heat-treated (the resin may optionally be intended to be removed from the places where it has not been heat-treated), said paint layer consisting, partly or completely, of a mixture a) of mineral fillers and b) of at least one crosslinkable polysiloxane resin (almost) free from carbon-based material(s) precursor(s) and/or of at least one crosslinked polysiloxane resin (almost) free from carbon-based material(s) and from carbon-based material(s) precursor(s) and/or of a porous, silica-based mineral matrix (the resin having, for example, been pyrolyzed and therefore mineralized), (almost) free from carbon-based material(s), the mineral fillers being distributed in the resin or the matrix.

As regards the thin layer or layers which may be used according to the present invention, they may be in the form of single layers or multilayers. They form preferentially one or more (semi)reflective layers having a mirror or shiny effect, (semi)reflective layers possibly also being obtained via layers comprising effect pigments, as explained subsequently.

According to a first particularly advantageous embodiment, it is possible to use, for example, at least one ((semi) reflective) layer formed from at least one (under)layer of metallic type and/or at least one (under)layer based on a dielectric material, this layer generally and advantageously having a mirror effect.

This layer may therefore be, for example, at least one single metallic or mainly metallic layer (for example a thin layer of Ag, W, Ta, Mo, Ti, Al, Cr, Ni, Zn, Fe, or of an alloy based on several of these metals, or a thin layer based on stainless steels, etc.), or may be a stack (or multilayer) of (under)layers comprising one or more metallic layers, for example a metallic (or mainly metallic) layer advantageously protected (coated on at least one face and preferably on its two opposite faces) by at least one layer based on a dielectric material (for example, at least one layer made from silver or aluminum coated with at least one $Si_3N_4$ protective layer—in particular an $Si_3N_4$/metal/$Si_3N_4$ multilayer—or an $SiO_2$ protective layer).

It may alternatively be a single layer coating based on a dielectric material having a high refractive index n, that is to say greater than 1.8, preferably greater than 1.95, and particularly preferably greater than 2, for example a single layer of $TiO_2$, or of $Si_3N_4$, or of $SnO_2$, etc.

In another advantageous embodiment, the layer may be formed from a stack (or multilayer) of thin (under)layers based on dielectric material(s) alternately having high (preferably greater than 1.8, or even 1.95, or even 2, as explained previously) and low (preferably less than 1.65) refractive indices, especially material(s) of the following types: metal oxide (or metal nitride or oxynitride), such as $TiO_2$, $SiO_2$ or mixed oxide (tin-zinc, zinc-titanium, silicone-titanium, etc.) or alloy, etc., the (under)layer firstly deposited, where appropriate, and being therefore against the inner face of the plate, advantageously being a layer of high refractive index.

As the material of the (under)layer having a high refractive index, mention may be made, for example, of $TiO_2$ or optionally $SnO_2$, $Si_3N_4$, $Sn_xZn_yO_z$, $Ti_zNO_x$, or $Si_xTi_yO_z$, ZnO, $ZrO_2$, $Nb_2O_5$, etc. As material of the (under)layer having a low refractive index, mention may be made, for example, of $SiO_2$, or optionally a silicon oxynitride and/or oxycarbide, or a mixed oxide of silicon and aluminum, or a fluoro compound, for example of the $MgF_2$ or $AlF_3$ type, etc.

The multilayer may comprise, for example, at least three (under)layers, the layer closest to the substrate being a layer of high refractive index, the intermediate layer being a layer of low refractive index and the outer layer being a layer of high refractive index (for example, a multilayer comprising the alternation of the following oxide layers: (substrate)—$TiO_2$/$SiO_2$/$TiO_2$).

The (geometric) thickness of each layer deposited based on thin layer(s) is generally between 15 and 1000 nm, in particular 20 and 1000 nm (the thickness of the substrate generally being a few millimeters, most often around 4 mm), and the thickness of each of the (under)layers (in the case of a multilayer) may vary between 5 and 160 nm, generally between 20 and 150 nm (for example in the case of the $TiO_2$/$SiO_2$/$TiO_2$ multilayer, it may be around a few tens of nanometers, for example around 60-80 nm, for the $TiO_2$ layers and around 60-80 or 130-150 nm for the $SiO_2$ layer depending on the appearance, for example more silvery or more golden, that it is desired to obtain).

The layer based on one or more thin films may be applied to the plate, generally after ceramification, in line or in a subsequent step (for example after the cutting and/or shaping of said plate). It may especially be applied by (powder, liquid or gaseous) pyrolysis, by evaporation or by sputtering). Preferably, it is deposited by sputtering and/or by a vacuum deposition and/or plasma-enhanced method; in particular, the method of depositing the layer(s) by cathodic sputtering (for example, by magnetron sputtering), especially enhanced by a magnetic field (and in DC or AC—continuous or alternative—mode) is used, the oxides or nitrides being deposited from suitable metal or alloy or silicon or ceramic, etc., target(s), if necessary under oxidizing or nitriding conditions (argon/oxygen or argon/nitrogen mixtures where appropriate). It is also possible to deposit, for example, oxide layers by reactive sputtering of the metal in question in the presence of oxygen and the nitride layers in the presence of nitrogen. To make the $SiO_2$ or $Si_3N_4$ it is possible to start from a silicon target that is lightly doped with a metal such as aluminum to make it sufficiently conductive. The (under)layer(s) chosen according to the invention condense on the substrate in a particularly homogeneous manner, without separation or delamination occurring.

In another embodiment of the invention, it is possible to use as the layer (especially the semireflective layer) a layer comprising effect pigments (pigments having a metal effect, interference pigments, pearly pigments, etc.), where appropriate dissolved in a suitable medium, this layer generally having a shiny or spangled effect. This layer is preferentially based on a molten silicate, glass frit or glass flux (vitrifiable mixture generally comprising oxides chosen especially from those used in frits for enamel, for example from silicon, zinc, sodium, boron, lithium, potassium, calcium, aluminum, magnesium, barium, strontium, antimony, titanium and zirconium oxides, etc.), and the effect pigments used are advantageously in the form of aluminum oxide ($Al_2O_3$) flakes coated with metal oxides; mention may be made, for example, of the pigment sold by Merck under the trademark XIRALLIC® such as $TiO_2$/$Al_2O_3$ pigments or interference pigments (XIRALLIC® T-50-10SW Crystal Silver or XIRALLIC® T-60-23SW Galaxy Blue or XIRALLIC® T-60-24SW Stellar Green), or $Fe_2O_3$/$Al_2O_3$ pigments (XIRALLIC® T-60-50SW Fireside Copper or XIRALLIC® F-60-51 Radiant Red).

Other effect pigments which may be used are, for example, pearly pigments based on mica particles coated with oxides or a combination of oxides (chosen, for example, from $TiO_2$, $Fe_2O_3$, $Cr_2O_3$, etc.), such as those sold under the trademark IRIODIN® by Merck, or based on silica platelets coated with oxides or a combination of oxides (like those above), such as those sold under the trademark COLORSTREAM® by Merck. Fillers or other conventional coloring pigments may also be incorporated into the aforementioned effect pigments. The content of effect pigments may be, for example, around 1 to 30 wt % relative to the base (molten silicate, glass frit or flux) into which they are incorporated. The layer may especially be deposited by screen printing (the base and the pigments being, where appropriate, suspended in a suitable medium generally intended to be consumed in a subsequent curing step, this medium possibly especially comprising solvents, diluents, oils, resins, etc.), the thickness of the layer being, for example, around 1 to 6 µm.

Other pigments (not necessarily effect pigments) may more generally be used in the case of an enamel layer, the enamel being formed from a powder comprising a glass frit and pigments (these pigments may also be part of the frit), and a medium for application onto the substrate (the examples of oxides forming the frits for enamel and of mediums having already been given in the two preceding paragraphs). The pigments may be chosen from the compounds containing metal oxides such as chromium, copper, iron, cobalt and nickel oxides, etc., or may be chosen from copper or cobalt chromates, etc., the content of pigment(s) in the whole frit(s)/pigment(s) assembly being for example between 10 and 50 wt %. The or each enamel layer used to form the coating is preferably a single layer, separated from any other optional enamel layer(s), and having a thickness that generally does not exceed 6 μm, preferably that does not exceed 3 μm. The enamel layer is, in general, deposited by screen printing.

The plates according to the invention are practical to use and easy to clean. The positioning of the whole of the coating on the lower face makes it possible to avoid, if necessary, unattractive optical effects such as double images, and at the same time makes it possible to avoid problems of abrasion of said coating during cleaning of the exposed face (outer or upper surface turned toward the user) of the plate in the use position.

The plates according to the invention are generally plates having two smooth faces, without studs on the lower face.

The coating is generally continuous in each of the regions that can be distinguished on the plate but it is not however excluded to have less covering depositions in certain places (for example of the type with a spotted part or with a mesh or with speckles, etc.), the level of coverage in these places however remaining preferentially high (close to 100%).

The plate according to the invention may, where appropriate, be provided (or associated) with additional functional or decorative element(s) (frame, connector(s), cable(s), control element(s), display(s), for example light-emitting diodes known as "seven-segment" light-emitting diodes, electronic control panel with touch-sensitive controls and digital display, etc.).

Preferably, the plate according to the invention is intended to be combined with underlying induction-heating elements. Heat sources for cooking by induction heating are known and are generally composed of a converter (or generator) connected to an induction coil (or inductor) formed by a coil of conducting wires. The electromagnetic field created by the flow of a high-frequency current produced by the converter generates Foucault currents in the metal base of cooking vessels placed on the plate, allowing these cooking vessels to be heated rapidly. The temperature variations and temperature maxima undergone by the plate are smaller than those observed with other heating elements, for example halogen or radiant elements, and consequently the plate according to the invention is particularly well suited to this method of heating, the thermal shocks undergone by the coating being smaller and less likely to damage it in the long term.

The plate according to the invention may advantageously be mounted on the insulating support, inside which are placed the heating element or elements, without an intermediate complex for masking the inside of the appliance from the user's view.

The invention also relates to appliances (or devices) for cooking and/or for maintaining at high temperature, comprising at least one plate according to the invention (for example cookers and built-in hobs). The invention also encompasses both cooking appliances comprising a single plate and appliances comprising several plates, each of these plates having a single burner or multiple burners. The term "burner" is understood to mean a place of cooking (heating). The invention also relates to mixed cooking appliances in which the hob or hobs comprise several types of burners.

Furthermore, the invention is not limited to the manufacture of cooking plates for cookers or hobs, the plates manufactured according to the invention possibly also being other plates that have to be largely unaffected by temperature variations.

Another subject of the invention is a process for manufacturing a plate according to the invention.

The manufacture of glass-ceramic plates generally takes place as follows: the glass, having a composition chosen for forming the glass-ceramic, is melted in a melting furnace, the molten glass is then rolled into a standard ribbon or sheet by making the molten glass pass between rolling rolls, and the glass ribbon is cut to the desired dimensions. The plates thus cut are then ceramified in a manner known per se, the ceramification consisting in firing the plates with the thermal profile chosen to convert the glass into the polycrystalline material called a "glass-ceramic", the expansion coefficient of which is zero or almost zero and which is resistant to a thermal shock possibly ranging up to 550° C. and preferably up to 700° C. The ceramification generally comprises a step of progressively raising the temperature up to the nucleation range, generally located in the vicinity of the glass conversion range, a step of passing through the nucleation range over several minutes, a further progressive rise in temperature up to the ceramification hold temperature, the maintaining of the ceramification hold temperature for several minutes, followed by rapid cooling down to room temperature.

The process generally comprises a cutting operation, for example by mechanical scoring using a scoring wheel, water jet or laser, generally followed by a shaping operation (grinding, optionally beveling, etc.).

The process for manufacturing the plate according to the invention is characterized in that most, and preferably all, of the coating is applied onto the face of the bare glass-ceramic plate intended to be turned toward the heating element(s) in the use position. Preferably, at least a first layer (or set of (under)layers) intended to form at least a first region is applied, and in which one or more resists (or reserves) are provided or made, and said resists are covered by at least a second layer (or set of (under)layers) intended to form at least a second region contrasting relative to the first region(s) (repeating the operation if one or more regions are planned).

The layers are applied by any means known to a person skilled in the art depending especially on the composition of the layers to be formed. Examples of the various possible application methods have been given previously. Depending on the type of layer, the deposition may be carried out before ceramification (the case, for example for an enamel layer which may be cured during the ceramification) or after ceramification (the preferred case for paint and for metallic-type layers or layers based on a dielectric material described previously; also possibly for enamels, etc.), in line or in a subsequent step (for example, after the cutting and/or shaping of said plate).

To form the resists, it is possible to use various means (depending on the type of layer deposited and the precision of the deposition means). The reserves may be left by the deposition technique (screen printing) or by providing suitable masks, for example made of sheet metal, etc. It is also possible to envisage depositing a layer which may be removed, in the area of the resists, by washing, ablation, polishing, etc., for example a paint deposition that is only hardened or crosslinked in the desired parts, the remainder being removed by washing, or else a deposition of layer(s) of metallic type or based on a dielectric material in which the resists are removed by means such as laser ablation or polishing.

Regarding the deposition of the second layer (or other optional layers), it may be carried out in the reserves or resists only (with suitable deposition means or masks, for example), or over a larger part of the plate, in particular over the whole plate.

For example, a first paint layer, for example a matt paint layer, is applied by screen printing (in one, or even several, passes or underlayers, and with resists provided), then, after heat treatment or curing of the paint and optional washing of the plate, the second layer (or set of (under)layers) is applied by covering all of the regions already covered and the resists with at least one (semi)reflective layer having a mirror effect, by cathodic sputtering (in the case of magnetron sputtering, it is indeed easier to carry out the deposition over the whole plate).

In another embodiment, the deposition order may be reversed, for example by depositing at least one continuous (semi)reflective layer on the lower face of the plate provided with masks at the locations of the chosen resists, removing the masks and recovering, if necessary, the parts already covered with other masks, then applying the paint, the paint advantageously only recovering, on the final plate obtained, the regions that are not covered by the reflective layer.

BRIEF DESCRIPTION OF THE FIGURES

The following examples illustrate the present invention without however limiting the scope thereof, together with the appended FIGS. 1 to 3 (derived from photographs) which represent:
for FIG. 1, a top view of a plate according to the invention; and
for FIGS. 2 and 3, fragmentary top views of two plates according to the invention showing their background regions, the pattern of which is in mesh form or speckled.

EXAMPLES

In the examples, a transparent glass-ceramic plate was manufactured, the two faces of which were smooth, from a glass having, for example, the composition described in Application EP 0 437 228.

This glass was melted at around 1600° C., in an amount such that a glass ribbon could be rolled, a ribbon from which glass plates having final dimensions of 56.5 cm×56.5 cm×0.4 cm were cut.

These glass plates were ceramified on ceramic grids using a ceramification cycle comprising the following steps:
a) the temperature was raised at 30-80° C./min up to the nucleation range, generally located in the vicinity of the glass conversion range;
b) the temperature passed through the nucleation range (670-800° C.) over about 20 minutes with a temperature hold of a few minutes;
c) the temperature was raised over 15 to 30 minutes up to the ceramification hold temperature T of around 930° C.;
d) the ceramification hold temperature T was maintained for a time t of around 20 minutes; and
e) the plate was rapidly cooled down to room temperature.

In example 1 (FIG. 1), the plate 1 was provided on its lower face, for example by three successive screen-printing passes, with a coating which, seen from above (via the transparency of the glass-ceramic bearing the coating) comprised regions intended for indicating or for seeing the elements in operation (represented here by the black parts 2 or dark gray parts 3), and a background region (represented here by the lightest part 4, also in the gray tones, where appropriate).

Figure 1:
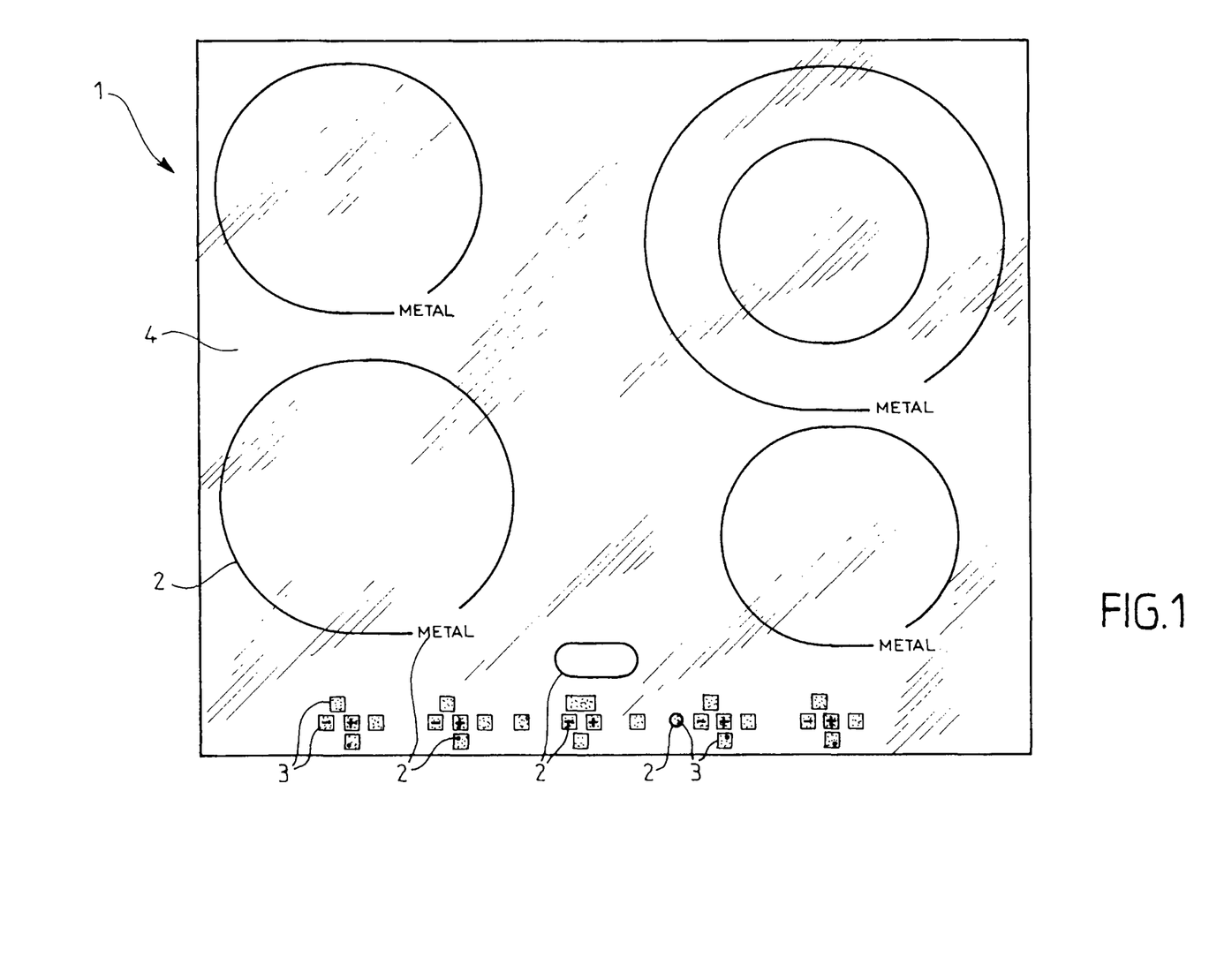

The coating was obtained from one and the same base paint, the pigments of which were modified at each pass so as to obtain the desired tone or effect (such as masking the heating elements when not in use and being able to see the signs when in operation). The paint may be applied after having been diluted in a suitable medium and may be a paint based on at least one polysiloxane resin (for example, obtained by mixing a silicone polymer and a silicone solution) and fillers (such as the pigment or mixture of pigments to give the desired shade).

After each application of paint (for example in one or more layers on each pass), firing or curing was carried out in an oven or tunnel. The thickness of a paint layer obtained was for example between 15 and 100 microns.

Between each pass, the screen-printing mask was changed depending on the coating parts to be formed.

The (black) parts 2 are here formed by: curved lines defining the locations which will be located above four heat sources for heating, and by a circle being located in the space inside the curved line defining the largest heat source for heating; regions forming the symbols +, − (signs) and a small circle forming the operating symbol and also four small squares so as to symbolize the location of the heat source in question on the plate; and mainly decorative signs such as a trademark or a name or a logo (symbolized by the central cartouche located just above the aforementioned signs) and the letters of the word METAL-associated with each curved line defining a heat source.

The (dark gray) parts 3 are formed from: squares or rectangles defining the regions which will be located above displays or signs (of time, power, etc.) including rectangles that make the signs +, − stand out and squares including the aforementioned small squares giving the position of the heat sources and also the inside of the black circle forming the operating symbol.

A glass-ceramic plate was therefore obtained having a pleasant and original esthetic appearance, this plate having an opaque matt background region hiding the underlying structure elements of the cooking device, and comprising a (dark gray) region 3 also hiding the underlying elements when not in use while enabling them to be seen when they are in operation. Besides the variation linked especially to the choice or the concentration of pigments that are more or less opacifying, the thicknesses of the regions varied (for example they were, depending on the regions, 10, 15 or 30 microns).

Since the coating is entirely on the lower face, there are no problems with double images or problems of abrasion of the pattern (for example, by rubbing of saucepans) nor of embrittlement of the pattern. Possible fingerprints left are invisible or barely visible. The plate may be mounted in a frame, built into a cooking appliance, etc.

Figure 2:
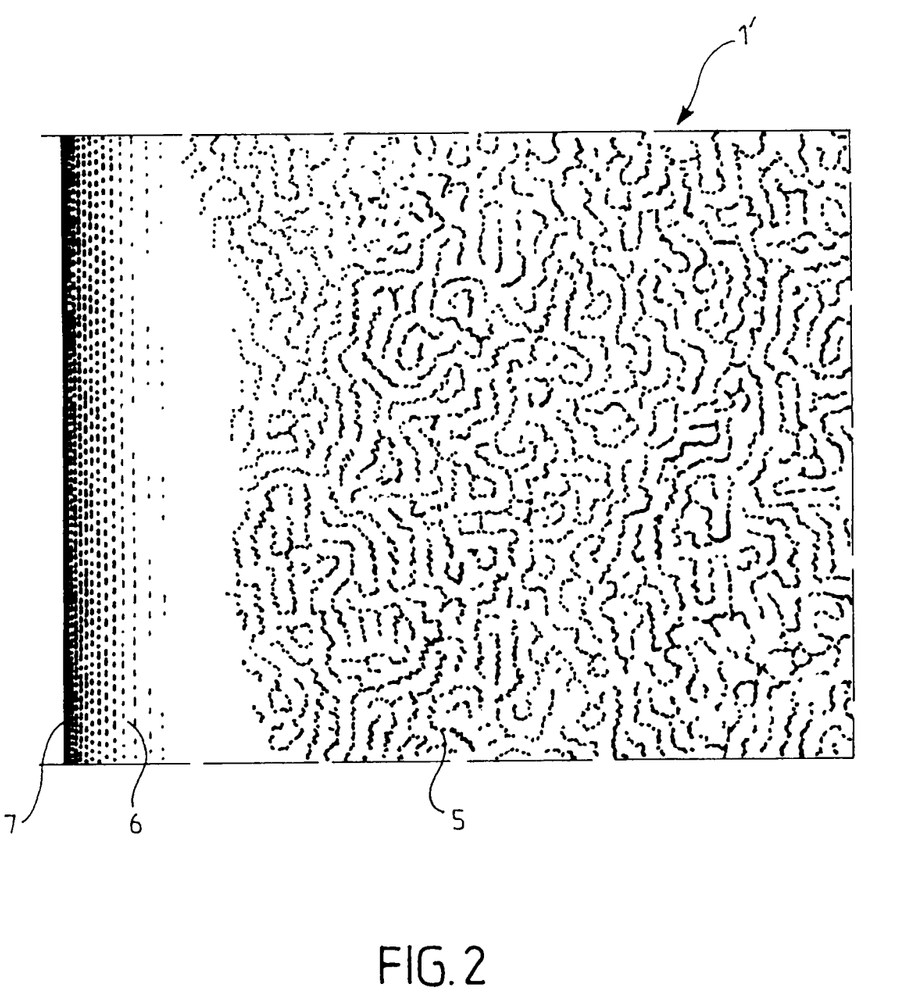

In FIG. 2, part of another glass-ceramic plate 1' according to the invention, showing a background pattern of mesh or speckled type 5 and its joining region 6, has been represented by alternate graduated shading of points, with a darker color region 7 intended to be part of a indicating region.

The coating from FIG. 2 was obtained, for example, in two passes, namely a first screen-printing pass to form the dark color regions using a paint, for example of the type used in example 1 in a thickness of 15 to 100 microns, then a second magnetron sputtering pass of a thin semireflective layer in thicknesses of about 20 nanometers, over the whole surface of the lower face of the plate that had already been coated with the paint. An example of the thin semireflective layer is a layer based on Ni—Cr—Fe.

Between the two passes, the paint was fired or cured in an oven or tunnel as indicated in example 1 and, where appropriate, washed before the sputtering.

Figure 3:
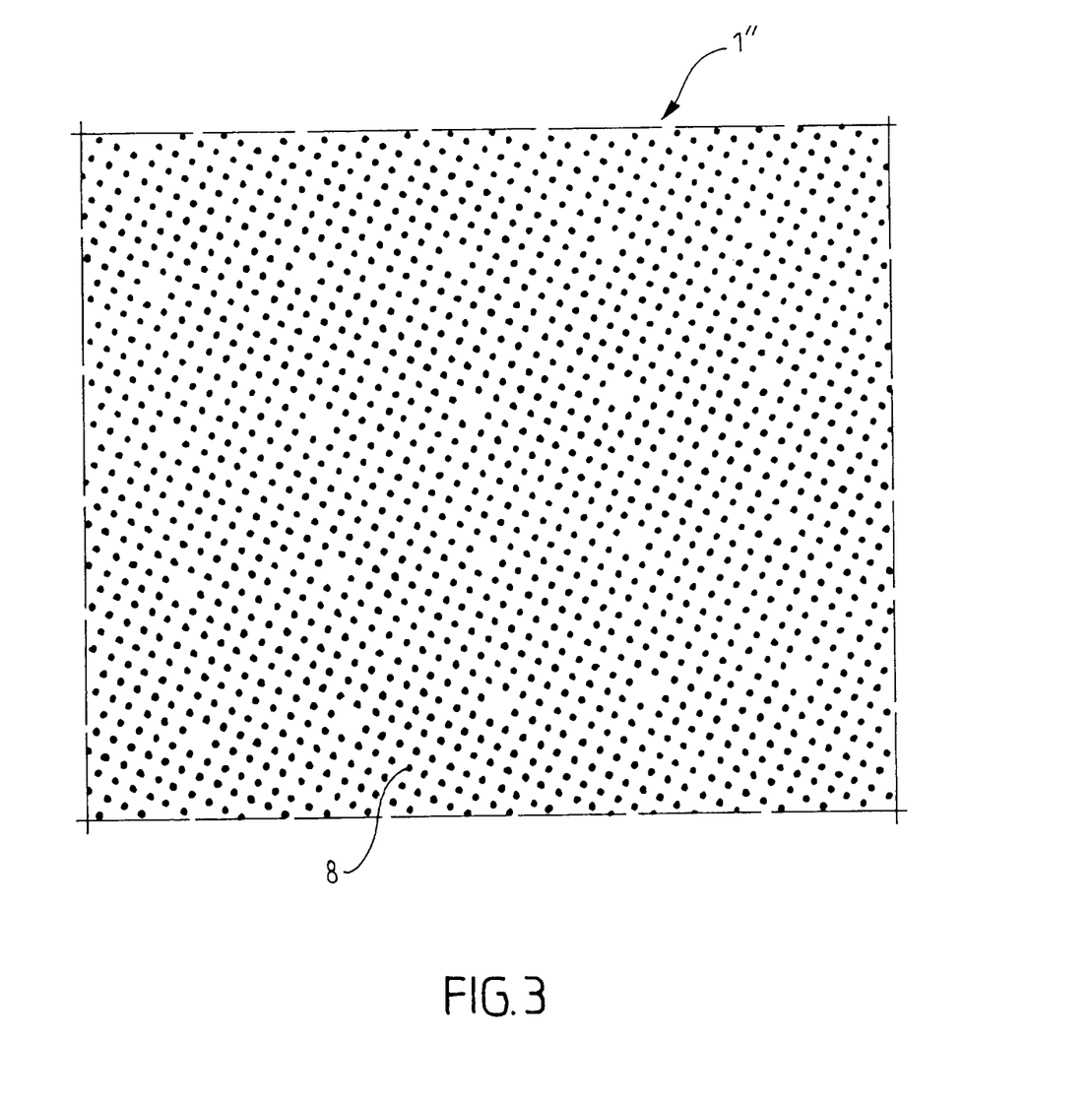

In FIG. 3, a part of the background coating of another glass-ceramic plate 1" produced according to a variant of example 2 by changing the screen-printing frame, is represented, this background being of the mesh or spotted type 8.

It can therefore be seen that it is possible to obtain plates with very varied screen patterns, especially having a light-scattering effect: mesh, spotted, speckled, etc. The distribution and scattering of the light, created by the underside of the plate, will have a most attractive effect (light wells) and could be chosen by the decorators and designers to best fit all the types of heating and underlying lighting elements.

The plates according to the invention may especially be used advantageously for producing a novel range of cooking plates for cookers or hobs.

The invention claimed is:

1. A transparent or translucent glass-ceramic plate, capable of covering or receiving at least one underlying heating element, wherein
   the plate has a coating which at least partly masks the at least one underlying heating element when not in use, while still allowing the at least one underlying heating element to be detected when in use,
   at least 90% of the coating is on the face of the plate to be turned toward the at least one underlying heating element in the use position,
   the coating has a region or a group of regions known as a background region(s), wherein the background region(s) occupy most of the surface of the coating, and
   the coating also has a region or a group of regions known as indicating region(s), wherein the indicating region(s) make it possible to display, relative to the background region(s), at least one of a pattern, a sign and location of functional elements, while also making it possible to detect when the elements are in operation or not, wherein the functional elements are selected from the group consisting of induction heating elements, control units and displays,
   wherein the background region(s) and the indicating region(s) being distinguished by their colors or their shades of color, their patterns, or a combination thereof, the separation between the various zones being carried out along clear lines or along areas having color or pattern graduations.

2. The glass-ceramic plate of claim 1, wherein the coating is applied over an entirety of a face of the plate.

3. The glass-ceramic plate of claim 1, wherein the background region(s) and the indicating region(s) are each formed by at least one layer of paint or at least one thin layer or a layer with effect pigments or an enamel layer.

4. The glass-ceramic plate of claim 1, wherein all of the background regions(s) and the indicating regions(s) of the coating are formed from thin layers of paint.

5. The glass-ceramic plate of claim 4, wherein the background regions(s) and the indicating regions(s) are distinguished by the fact that different paints or paints having the same base but with different pigments or mixtures of pigments or with different pigment concentrations, or else paint applied with different thicknesses or applied with a different number of layers, have been used.

6. The glass-ceramic plate of claim 1, wherein the coating comprises regions having a mesh or speckled or spotted screen or patterns.

* * * * *